United States Patent [19]

Feilchenfeld

[11] 4,059,749

[45] Nov. 22, 1977

[54] DIGITAL MONITOR

[75] Inventor: Michal M. Feilchenfeld, Pittsburgh, Pa.

[73] Assignee: Westinghouse Electric Corporation, Pittsburgh, Pa.

[21] Appl. No.: 740,280

[22] Filed: Nov. 9, 1976

[51] Int. Cl.² ........................................... G06F 11/00
[52] U.S. Cl. ................................... 235/302; 235/304.1
[58] Field of Search ................. 235/153 AK, 153 AC, 235/153 A; 324/73 R

[56] References Cited

U.S. PATENT DOCUMENTS

| | | | |
|---|---|---|---|
| 3,518,413 | 6/1970 | Holtey | 235/153 AK |
| 3,536,902 | 10/1970 | Cochran et al. | 235/153 A |
| 3,582,633 | 6/1971 | Webb | 235/153 AC |
| 3,713,095 | 1/1973 | McPherson | 235/153 A |
| 3,976,864 | 8/1976 | Gordon et al. | 235/153 AC |

Primary Examiner—Charles E. Atkinson
Attorney, Agent, or Firm—J. B. Hinson

[57] ABSTRACT

A monitor for checking a plurality of multi-bit digital patterns generated by a system being monitored to determine that each pattern is valid, that each of the patterns appear in the right sequence and that the total number of valid patterns detected during the testing cycle is as expected is disclosed. Additionally, the bit patterns are monitored to detect unexpected transitions. The results of these tests are then combined to form a composite malfunction signal indicative of the operational status of the system being monitored.

5 Claims, 5 Drawing Figures

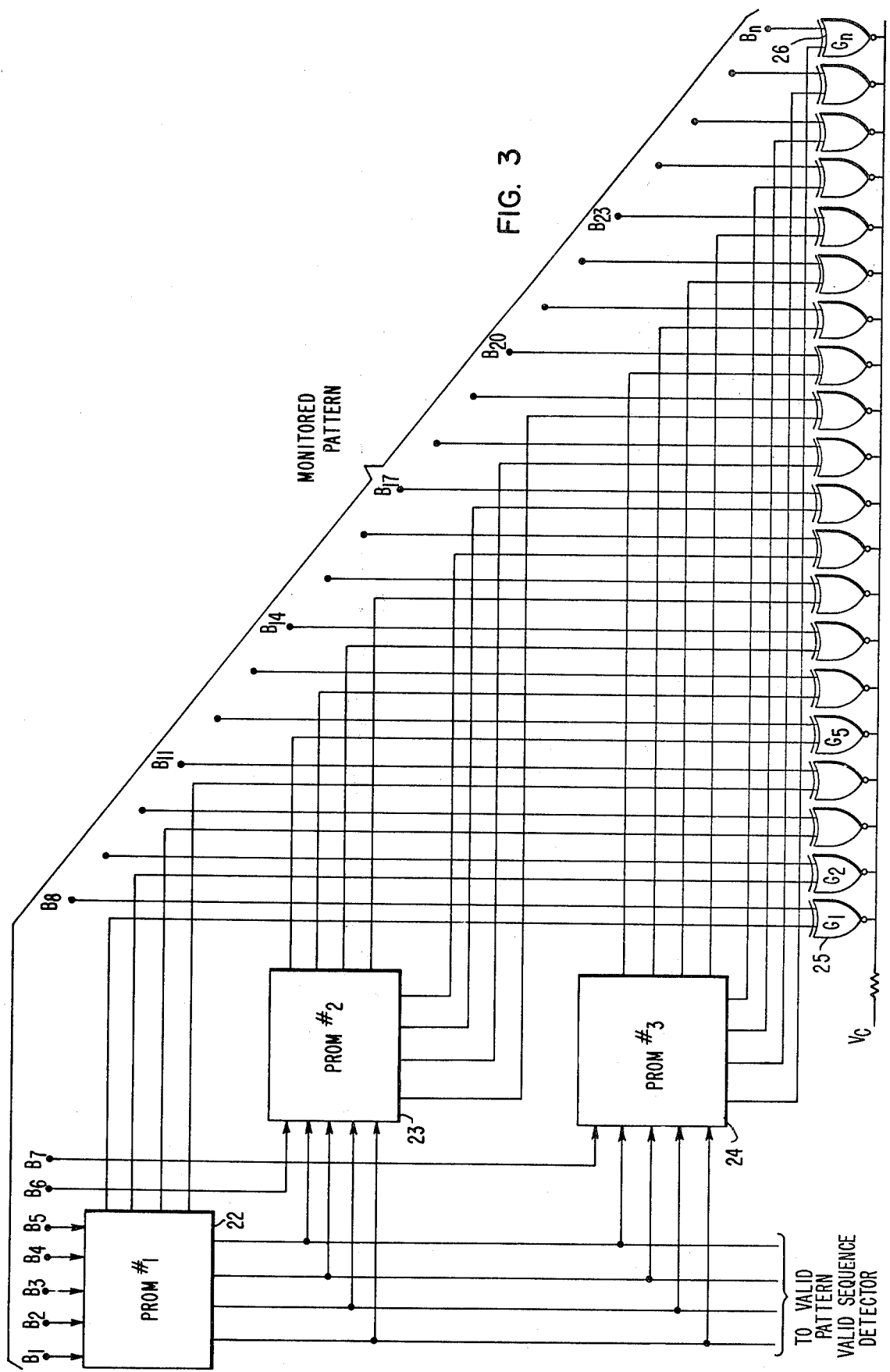

DIGITAL MONITOR

BACKGROUND OF THE INVENTION

1. Field of the Invention

The invention relates to monitoring circuits and more particularly to monitoring circuits for determining the operational status of a digital system by checking bit patterns generated by the system to determine that they are valid, in the proper sequence, that the total number of valid patterns generated during each operating cycle is as expected, and that the monitored patterns contain no unexpected transitions.

2. Description of the Prior Art

Prior art monitors for monitoring digital systems have typically utilized an address generator to generate addresses to read digital patterns from a memory. The bit patterns being monitored were then compared to the bit patterns read from the memory on a bit by bit basis to determine if the pattern being monitored was as expected. Each time a valid pattern was detected, a counter was stepped one count. At the end of the cycle of the circuit being monitored, the counter was interrogated to determine if the expected number of valid patterns had been detected. If the expected number of valid patterns was not detected, a signal indicating a system malfunction was generated. These monitors also could include transition counters for counting the transitions of signals during a specified time period to determine if the expected number of transitions occurred.

While these systems operated as expected, the address generator required considerable circuit complexity and the transition counter circuit might miss errors due to a misalignment of the transitions with respect to time but not with respect to their number.

SUMMARY OF THE INVENTION

For the purpose of description of the monitor, each monitored pattern can be considered as consisting of three distinct portions with the bits designated $B_1$ through $B_n$. In the preferred embodiment N = 21. The first five bits are used as an address by a first programmable read-only memory to read up to sixteen eight bit digital words from this memory. Four bits of each of these words are used as sequence tags and can have a numerical value ranging from zero to sixteen. The remaining four bits are used as data and are compared to bits $B_8$ through $B_{11}$ of the pattern being monitored.

Bits $B_6$ and $B_7$ of the monitored pattern and the sequence tags from the first programmed read-only memory one are used as a five bit address to second and third programmed read-only memories to read eight bit data words from these memories. Bits $B_{12}$ through $B_{21}$ of the pattern being monitored are compared to the digital words read from the second and third programmable read-only memories.

The above-described comparison of the words read from the programmed read-only memory to bits $B_8$ through $B_{21}$ of the pattern being monitored is performed by coupling the data read from the programmable read-only memories and bits $B_8$ through $B_{21}$ to the inputs of an array of exclusive OR gates. The data stored in the read-only memories is selected such that when the pattern from the system being monitored contains the expected pattern of logic one and logic zero bits, there will be a one to one correspondence between the data read from the memories and the corresponding bits of the pattern being monitored. The outputs by the exclusive OR gates are wired in an AND arrangement to produce a digital signal indicating the presence or absence of a valid pattern.

Each time a valid bit pattern is detected, a counter is stepped one count. The output of this counter is compared to the sequence tags read from the first programmable read-only memory to determine if the pattern is in the proper sequence. If the pattern is not in the expected sequence, a digital sequence error signal is generated to indicate detection of a sequence error. At the end of the testing cycle the contents of the counter and the status of the sequence error signal are examined to generate a pattern fault malfunction signal if the correct number of expected patterns have been detected in the expected sequence.

Additionally, the bits of the pattern being monitored are coupled to a spurious transition detector. If any transitions occur at unexpected times, a spurious transition fault signal is generated which indicates a system malfunction. Thus a fault signal is generated if the correct number of valid patterns is not detected, if any pattern appeared in the wrong sequence or if the bit pattern being monitored contains any unexpected transition. These fault signals are combined to form a composite malfunction signal.

BRIEF DESCRIPTION OF THE DRAWINGS

FIG. 3 is a diagram illustrating the use of program read-only memories in the pattern fault detector;

DETAILED DESCRIPTION

Figure 1:
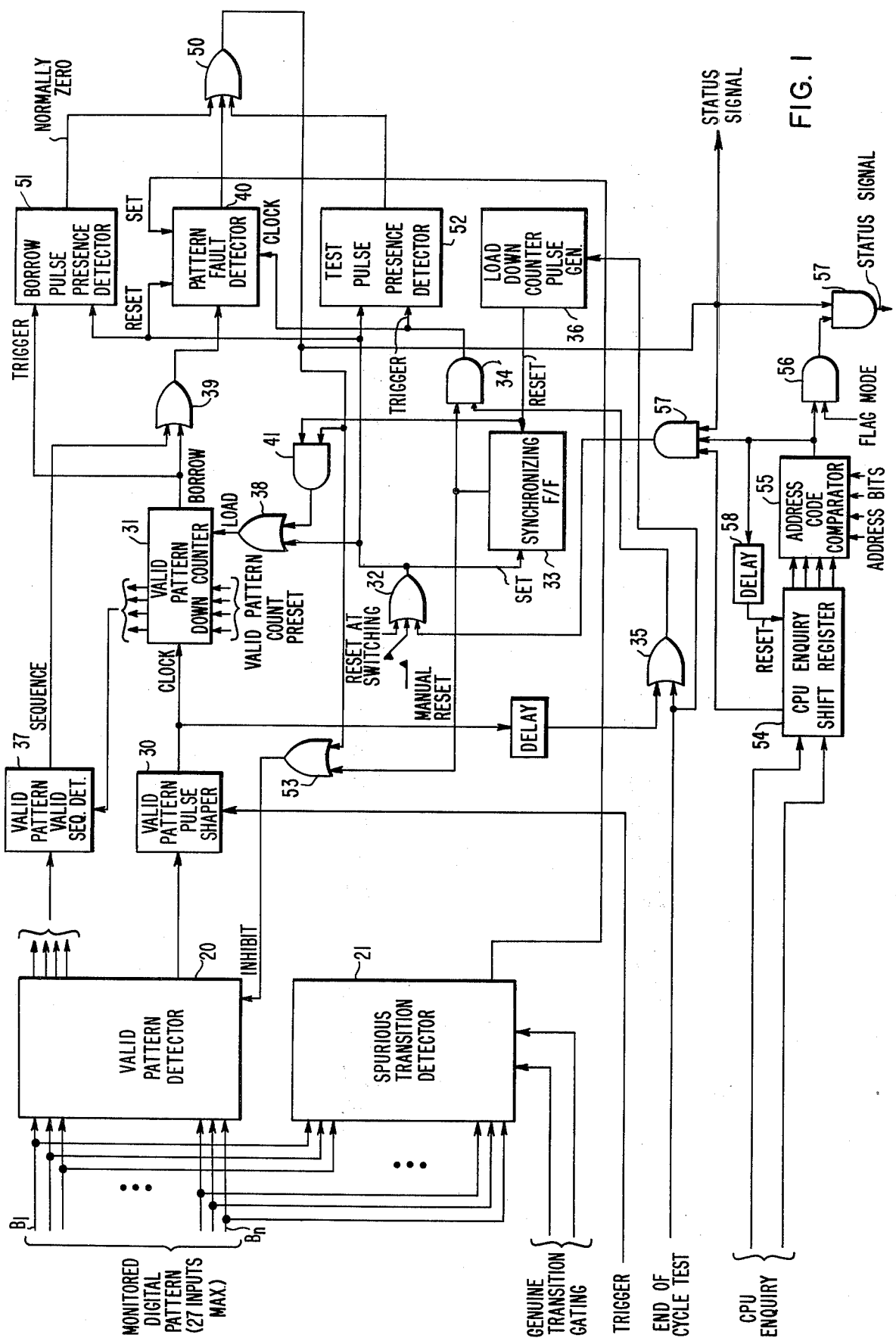
FIG. 1 is a block diagram of the digital monitor.
Figure 2:
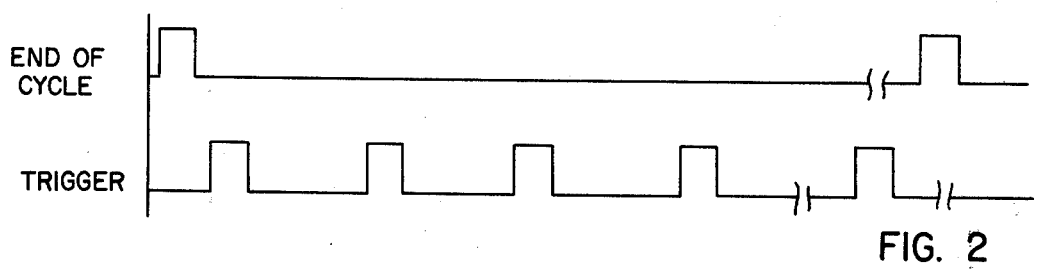
FIG. 2 is a waveform diagram of control signals generated by the circuit being monitored.

FIG. 1 is block diagram of the monitor which is the subject of this invention. The digital patterns from the circuit being monitored are sequentially coupled to a valid pattern detector circuit 20 and to the spurious transition detection circuit 21. The digital monitor also receives a trigger signal and an end of cycle signal from the system being monitored. These signals are illustrated in FIG. 2.

One of the patterns to be monitored occurs between each adjacent pair of pulses of the trigger signal. The patterns to be monitored are coupled to the input of the valid pattern detector 20. The bits of the pattern to be monitored have been labeled $B_1$ through $B_n$ for convenience of description. In the preferred embodiment described in detail N = 21. The valid pattern detector includes three programmable read-only memories respectively illustrated at reference numerals 22, 23 and 24 (FIG. 3). The first five bits of the pattern to be monitored are coupled to the first programmable read-only memory 22 as address inputs. In response to each address coupled to the programmable read-only memory 22, an eight bit digital word is read with four of these bits being utilized as a portion of the address inputs to the second and third programmable read-only memories, illustrated at reference numerals 23 and 24, and as sequence tags by the valid sequence detector which will be described later. Bits $B_6$ and $B_7$ of the pattern being monitored are utilized as the fifth bits of the address inputs to programmable read-only memories 23 and 24. Each of the bits of the monitored pattern ranging from $B_8$ to $B_n$ serve as a first input to exclusive OR gates $G_1$ through $G_n$ with $G_1$ being illustrated at reference numerals 25 and $G_n$ being illustrated at reference numeral 26. The second input to the exclusive OR gates $G_1$ through $G_n$ are the remaining four bit of the output of programmable read-only memory 22 and the eight output bits of programmable read-only memories 23 and 24. The outputs of all of the exclusive OR gates $G_1$ through $G_n$ are connected in parallel to generate a logic one signal whenever the output of any one of the gates $G_1$ through $G_n$ is a logic one. The data in the first program read-only memory 22 is selected such that when the bits $B_1$ through $B_5$ have the expected patterns and sequence, the four bits coupled to the valid sequence detector will sequentially assume decreasing values between N-1 and 0 where N-1 is the number of expected valid patterns during the operating cycle and the remaining four bits will have a one to one correspondence to bits $B_8$ to $B_{11}$ of the pattern being monitored. ($N_{max} = 16$). The data stored in programmable read-only memories 23 and 24 are selected such that when a valid pattern appears, both inputs to each exclusive OR gates $G_5$ through $G_n$ of the array are identical. This results in an output signal from the $G_1$ to $G_n$ indicating that the pattern is valid.

The output of the valid pattern detector 20 is coupled as a first input to a valid pattern pulse shaper 30 (FIG. 1). The second input to the valid pattern pulse shaper circuit 30 is the pulses of the trigger signal illustrated in FIG. 2. The output of the valid pattern pulse shaper circuit is a pulse synchronized with the trigger signal. This pulse steps a valid pattern down counter 31, one count for each valid pattern detected.

Overall synchronization of the monitor circuit is provided by synchronizing flip-flop 33. This flip-flop is set inhibiting operation of the monitor by the output of OR gate 32 when the monitor is initially turned on, by a manually activated reset signal or by an external system which interrogates the monitor. Setting this flip-flop inhibits the monitor by disabling the valid pattern detector 20 through OR gate 53 and flow of clock pulses to pattern fault detector 40 through AND gate 41. The reset signal for flip-flop 33 is the output signal of load down counter pulse generator 36. Load down counter pulse generator 36 is a pulse shaper for shaping the leading and trailing edges of the pulses of the end of cycle signal to assure that the flip-flops and other circuits of the monitor operate properly.

Resetting of flip-flop 33 permits the normal monitoring cycle to begin by enabling gate 34 and the valid pattern detector 20. Thus irrespective of the instant the monitor is switched on or reset, the monitor remains inhibited until the first pulse of the end of cycle signal. This prevents the generation of odd number of valid pattern pulses over an unknown fraction of the operating cycle resulting in a nuisance alarm when the monitor is switched on.

A down counter 31 is also preset to the expected number of valid patterns. The preset pulse for this counter is the output pulse from OR gate 38 and is either generated by the reset signal to flip-flop 33, or the output signal from load down counter pulse generator 36 at the end of each test cycle.

Each time a valid pattern is detected, valid pattern pulse shaper 30 generates a pulse which reduces the count in the valid pattern down counter 31 by one count. The output of the valid pattern down counter 31 is coupled to a first input of the valid pattern sequence detector 37. The second input to the valid pattern sequence detector 37 is the sequence tags from the valid pattern detector 20. As previously explained, the sequence tags from the valid pattern detector 20 is a four bit digital number which sequentially decreases through values ranging from N-1 to 0 provided the patterns being monitored are in the right sequence. N is the expected number of valid patterns during the operating cycle. Thus, by comparing the number from the valid pattern detector 20 to the contents of the valid pattern down counter 31, a signal is generated indicating whether or not the patterns are in the expected sequence. If the patterns are not in the expected sequence, an error signal is generated which is coupled to one input of an OR gate 39. The output signal of OR gate 39 is the D signal of the pattern detector flip-flop 40. The other input to OR gate 39 is the borrow signal from the valid pattern down counter 31. This latter signal will be present at the end of each cycle of the system being monitored provided the valid pattern detector circuit 20 has detected the expected number of valid patterns causing the value stored in the valid pattern down counter 31 to decrease to zero. At the end of each cycle of the system being monitored, a pulse of the end of cycle signal is coupled through OR gate 35, AND gate 34 to generate a clock signal for the fault detector flip-flop 40. Thus, if either the valid pattern sequence detector 37 or the valid pattern down counter indicates detection of an error, the pattern fault detector 40 will change state, when clocked to generate an error signal.

The output of the pattern fault detector flip-flop 40 is one of the inputs to an OR gate 50. The borrow signal from the valid pattern down counter 31 indicating that this counter has been stepped the expected number of times is utilized as a trigger input to a borrow pulse detector circuit 51. This circuit may simply be a retriggerable monostable flip-flop with a period such that if the monitor is cycling through its entire sequence at the expected rate, the trigger is sufficiently frequent to maintain the output of this monostable at zero.

The clock signal to the pattern fault detector flip-flop 40 is coupled to a test pulse presence detector monostable flip-flop 52. This circuit may also be monostable which is retriggered by the clock signal to pattern fault detector flip-flop 40 and is timed such that if these pulses occur at the expected rate, the output of the monostable is always zero. The output signal of the borrow pulse presence detector 51 and the test pulse presence detector 52 form second and third inputs to OR gate 50. Thus, an output from OR gate 50 indicates that either the pattern fault detector flip-flop 40 is set as a result of a faulty pattern being detected or the output of either borrow pulse or test pulse presence detector monostables changed to logic one, indicating that at least one of these signals is not occurring at the expected rate or is missing altogether indicating that the monitor is malfunctioning. The output of OR gate 50 is the error of status signal. This signal is also coupled through OR gate 53 to form an inhibit signal to the valid pattern detector circuit 20 to prevent further operation when an error is detected.

The patterns of multi-bit digital signals from the circuit being monitored are also coupled to the spurious transition detector circuit 21. When this circuit indicates that a spurious transition has occurred, an error signal is generated which directly sets the pattern fault detector flip-flop 40 to generate a signal indicating that an error has been detected. Since this signal is not clocked by the timing signals from the circuit being monitored, it may occur at any portion within the cycle of the system being monitored.

Figure 4:
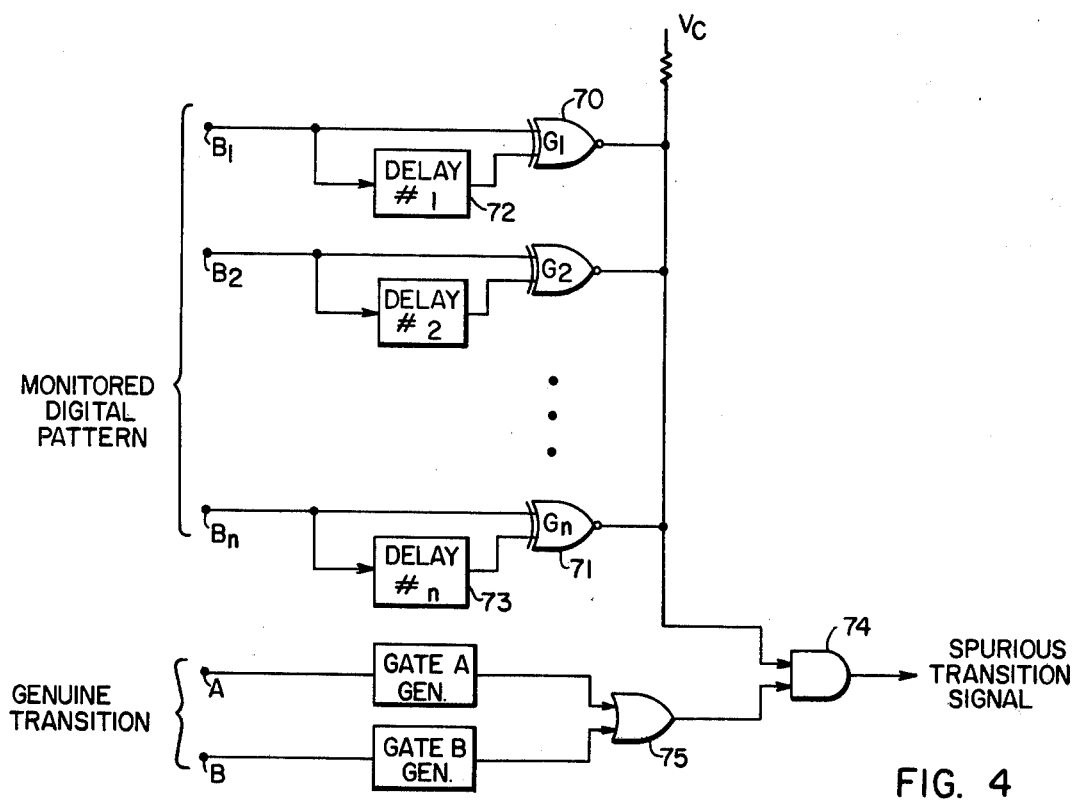
FIG. 4 is a circuit diagram of the spurious transition detector.

FIG. 4 is a more detailed schematic of the spurious transition detector circuit 21. Each of the bits of the pattern being monitored previously designated $B_1$ through $B_n$ are coupled to the first input of respective exclusive OR circuit $G_1$ through $G_n$. Exclusive OR circuit $G_1$ is illustrated at reference number 70 in FIG. 4 with exclusive OR gate $G_n$ being indicated at reference numeral 71. Each of the bits is also coupled through respective delays labeled 1 through n in FIG. 4 to form the second input to exclusive OR gates $G_1$ through $G_n$. Delay number one is indicated at reference numeral 72 with delay number n being indicated at reference numeral 73. The output of each of the delays forms an second input to the associated exclusive OR circuit. For example, the output of delay #1 forms a second input to exclusive OR circuit $G_1$ with the output of delay #n forming the second input to exclusive OR circuit $G_n$.

Figure 5:
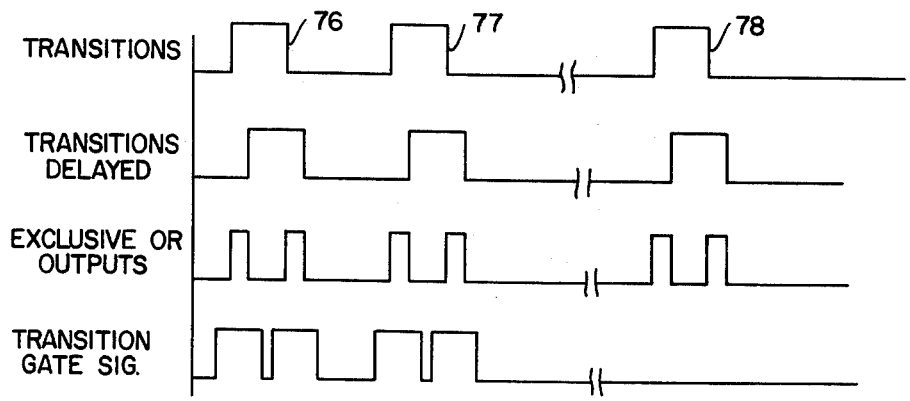
FIG. 5 is a diagram illustrating waveforms related to the operation of the spurious transition detector.

Typical transitions of one of the input bits, for example the $B_1$ bit which is the input to $G_1$ is illustrated in the top line of FIG. 5. The second line of FIG. 5 shows this input as delayed by delay number 1 and applied to the second input of $G_1$. Since the output of $G_1$ is only a high level when the two inputs are different delaying one of the inputs as described above will cause the output of $G_1$ to be a series of narrow pulses as illustrated in line 3 of FIG. 5. Thus line 3 of FIG. 5, shows that the output of $G_1$ will be a series of sharp pulses at each transition of the $B_1$ bit. Gate $G_2$ through $G_n$ perform in a similar fashion with respect to their respective input signals. The output of all of the exclusive OR gates $G_1$ through $G_n$ are connected in parallel to generate a composite signal consisting of a train of short pulses at the transition of any of the input signals consisting of bits $B_1$ through $B_n$. This composite signal forms one input to an AND gate 74.

The system being monitored also generates expected transition disabling gate signals having a width and a position sufficient to overlap each of the pulses of the composite output signal from gates $G_1$ through $G_n$ which represents expected transitions in the pattern being monitored. In FIG. 4 two disabling gate generators are indicated and labeled A and B. These gate generators are a part of the system being monitored. The output signals of these generators are the inputs to an OR circuit 75 whose output forms the second input to the AND gate 74.

In FIG. 5, the first two pulses of the $B_1$ bit are indicated at 76 and 77. These pulses are expected transitions with the output pulses from gate $G_1$ as shown in line 3. The output pulses of $G_1$ resulting from these expected transitions are overlapped by pulses of the expected transition gate signal illustrated in the bottom line of FIG. 5. However, the third pulse of the $B_1$ bit illustrated at reference numeral 78 is a spurious transition. This results in two small pulses in the composite output signal from $G_1$ which have no corresponding pulses in the expected transition gate signal. Therefore, these signals will be transmitted through AND gate 74 and produce an output indicating that spurious transitions have been detected.

The output signal from the spurious transition detector 21 illustrated in FIG. 1 directly sets the pattern fault flip-flop 40. The output of this flip-flop is coupled through OR gate 40 and generates a signal indicating a fault has been detected. Since this signal is not clocked by either the trigger or end of cycle signals, it may occur at any instant during the operating cycle of the circuit being monitored.

The monitor also includes circuitry permitting the status of the system being monitored to be determined by interrogation from an external system such as a digital computer. Interrogation is accomplished by shifting a code identifying the particular monitor into a shift register 54. The code and clock signal is provided by the computer performing the interrogation. The output of the register 54 is coupled as a first input to a comparator 55. The second input to comparator 55 is a code designating the appropriate monitoring circuit. When the codes coupled to the comparator are identical, a logic one output signal is generated. This signal is fed to the first input of an AND gate 56. The second input to AND gate 56 is a flag mode control signal enabling the interrogation by the computer. The output signal of AND gate 56 is used to control a second AND gate 57 from whose output the monitor status signal to an external system is derived.

The output signal of comparator 55 is coupled as one input to an AND gate 57. The other inputs to this AND gate are the status signal and one extra bit in the inquiry register 54. The extra bit indicates that the associated monitor circuit should be reset. Thus, when all inputs to AND gate 57 are logic one, a monitor reset signal is generated which is coupled through OR gate 32. The output signal of comparator 55 is also coupled to the first input of a delay circuit 58 to generate a reset signal for inquiry register 54. Resetting of the inquiry register 54 causes the output of comparator 55 to go to a logic zero and disabling of gate 56. Thus, under external computer inquiry, the status signal output of AND gate 57 is a pulse whose width is determined by the pulse width of delay at 58.

The monitoring circuit described above can be used with combinational or sequential logic. The monitor will not only indicate that the associated logic system has malfunctioned because of a hardware failure but it will also indicate a malfunction due to errors in the input to the monitored system. This generates little problem when the system being monitored is truly independent. However, it can cause considerable difficulties when a plurality of systems are interconnected in a feedback loop so that malfunctions may propagate through the various systems. This problem is somewhat alleviated by the transition detector circuit due to the fact that this circuit may detect errors before they have propagated through subsequent systems.

The monitor described above can be implemented using commercially available circuits. For example, the entire monitor may be implemented using standard TTL circuits. Alternatively the memories may utilize TTL circuits and the remainder of the monitor may utilize MOS circuits. The detailed implementation of the monitor is within the ordinary skill of a logic designer. Therefore, for purposes of simplicity, no detailed logic diagrams are included.

I claim:

1. Apparatus for determining the operational status of a digital system comprising:
   a. first means for receiving as an input digital signals, each of said signals including a plurality of bits having a predictable bit pattern indicative of the operational status of said digital system, and for generating in response thereto a pattern fault signal for each of said digital signals having an unexpected bit pattern;

b. second means for receiving as an input said digital signals and for in response thereto generating an error signal for each pattern found to be in an unexpected sequence; and c. third means for combining said pattern fault and said error signals to generate a composite status signal indicative of the operation status of said digital system.

2. Apparatus in accordance with claim 1 wherein said first means includes:

a. a first memory which receives a portion of the bits of said input signal as an address to read stored data from said first memory;

b. second and third memories for receiving a portion of the stored data read from said first memory and a portion of the bits of said signals as address inputs to read data from said second and third memories; and c. compare means responsive to portions of the data from said first, second and third memories and portions of the bits of said digital signal to generate a fault signal when said signal includes an unexpected bit pattern.

3. Apparatus in accordance with claim 1 wherein said second means includes:

a. fourth means responsive to a first portion of the bits of said digital signal to generate a series of sequential numbers if the bit pattern of said first portion is as expected;

b. fifth means responsive to a second portion of the bits of said digital signal to generate a count of the detected number of expected bit patterns; and c. sixth means responsive to said sequential number and said count of the detected number of expected but patterns to generate said sequential error signal.

4. Apparatus in accordance with claim 3 wherein:

a. said fifth means includes a digital counter which is stepped one count for each of said input signals found to have an expected bit pattern.

5. Apparatus in accordance with claim 4 further including compare means for comparing said sequential number to the number stored in said counter to generate said sequence error signal when they are different.

* * * * *